Oct. 18, 1927.  
O. REINHARDT  
1,646,360  
CURTAIN ROD HOLDER  
Filed Dec. 10, 1926

Otto Reinhardt  
INVENTOR  
BY Joseph A. Miller  
ATTORNEY

Patented Oct. 18, 1927.

1,646,360

UNITED STATES PATENT OFFICE.

OTTO REINHARDT, OF CENTRAL FALLS, RHODE ISLAND.

CURTAIN-ROD HOLDER.

Application filed December 10, 1926. Serial No. 153,829.

This invention relates to certain new and useful improvements in curtain rod holders, and the primary object thereof is to provide a device of this character which is of simplified construction and which can be economically produced.

A further object of the invention is to provide a holder which involves a minimum of parts that can be easily and quickly assembled to afford a rigid and strong structure.

In the drawings:—

Figures 1, 2, 3, 4:
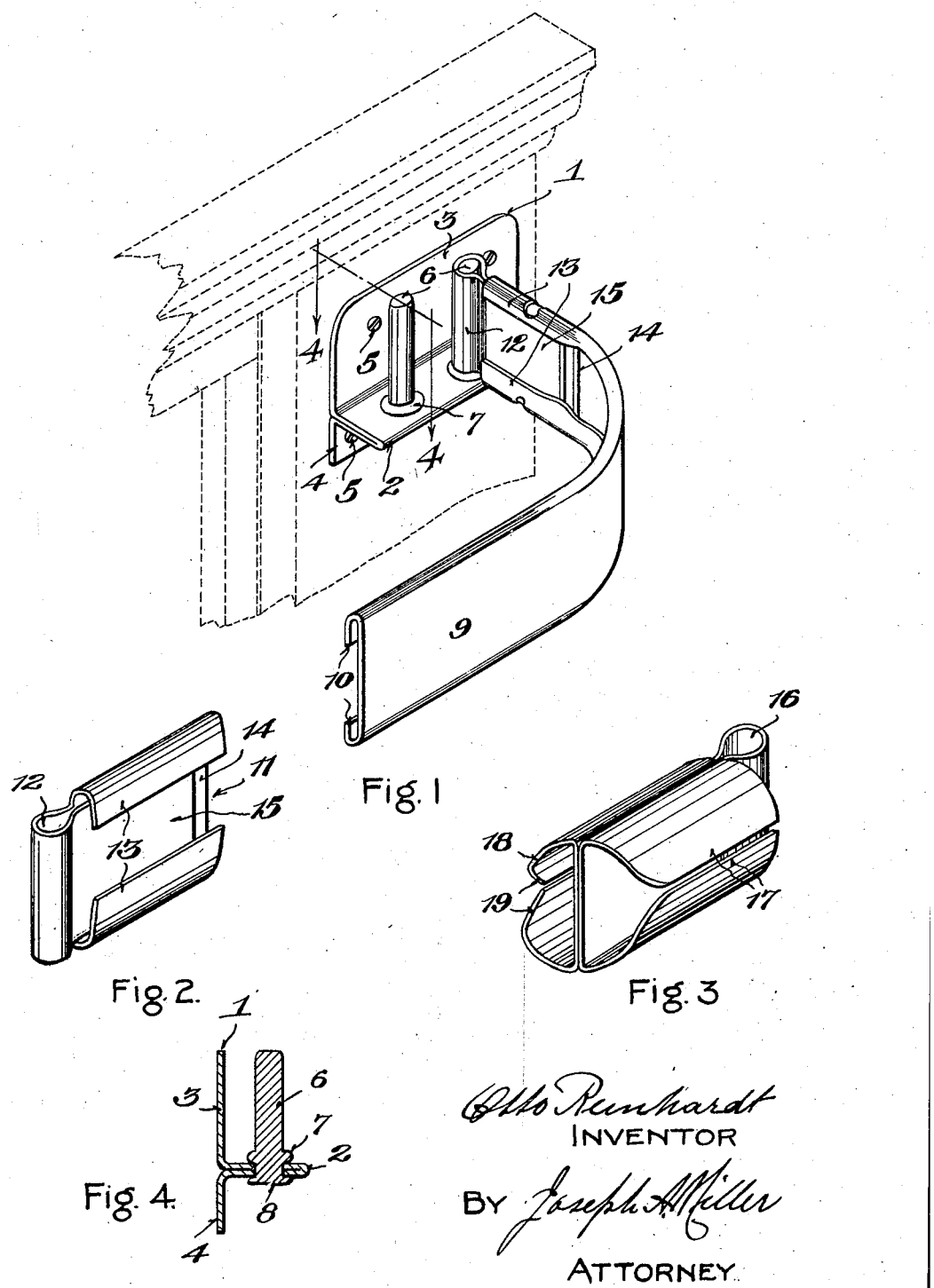
Figure 1 is a perspective view of the invention.
Figure 2 is a detail perspective view of the rod fitting.
Figure 3 is a view similar to Fig. 2 of a modified form of the invention.
Figure 4 is a section on line 4—4 of Fig. 1.

In proceeding in accordance with the present invention, a bracket 1 is employed which is formed of a piece of sheet metal doubled upon itself to form a ledge 2, and wings 3 and 4 the latter wing preferably being of less width than the wing 3. The wings extend at right angles to the ledge, and are formed with apertures to receive attaching screws 5. A post or stem 6 having a shoulder 7 is passed through an opening provided therefor in the ledge and has its end upset at 8 to not only secure the post to the ledge but to also hold the doubled parts of the metal in firm contact, thus providing a rigid and strong structure.

The curtain rod 9 has curled or rolled side edges 10 which are engaged over the rod fittings 11. The fittings 11 are each formed of a single piece of metal doubled upon itself to provide an eye or socket 12, the metal blank being formed with extensions 13 on the side 14 thereof that are bent inwardly to overlie the opposite side 15 thereby to hold the latter against outward movement. The extensions 13 are rolled or curled so as to provide wings that are received within the curled edges 10 of the rod 9 so as to support the latter.

From the foregoing it will be apparent that the entire structure involves but four parts, including the rod. It will be also noted that the ledge is composed of two thicknesses of the blank so as to have increased strength in sustaining the weight of the curtain rod and the draperies.

In modification shown in Fig. 3, a metal blank is doubled upon itself to form a socket 16, the sides of the blank having extensions, 17, 18 and 19 which latter are bent to provide friction wings to engage within the ends of a hollow round rod, the latter not shown. These extensions are compressible to permit the rod to be engaged thereover, and can be variously shaped to afford the desired frictional engagement with the rod.

Having thus described my invention what I claim as new and desire to secure by Letters Patent is—

1. In a combination with a bracket having a post, a rod fitting composed of a metal member doubled upon itself intermediate its ends to form a socket to receive the post, the free ends of the member being disposed in lapping relation and the sides of one of the ends being bent to overlie the other end to hold the ends against separation and to form wings to engage within a curtain rod.

2. In combination with a bracket having a post, a rod fitting composed of a metal member doubled upon itself to form a socket to receive the post, and wings on the sides of one of the ends of the member formed to engage a curtain rod.

3. A curtain rod fitting composed of a metal member doubled upon itself to form a socket and having the sides of one of its free ends bent to provide wings to engage and support a curtain rod.

4. In combination with a bracket having a post, a rod fitting composed of a flat metal member doubled upon itself intermediate its ends to form a socket to receive the post, and a curtain rod formed to engage over the sides of both of the ends of the member.

5. In combination with a bracket having a post, a rod fitting composed of a flat metal member doubled upon itself intermediate its ends to form a socket to receive the post, the sides of one of the ends of the member being curved toward each other and overlying the other end of the member.

In testimony whereof I have signed my name to this specification.

OTTO REINHARDT.